(12) United States Patent
Weber

(10) Patent No.: US 8,819,889 B2
(45) Date of Patent: *Sep. 2, 2014

(54) WINDSHIELD WIPER ASSEMBLY

(71) Applicant: Trico Products Corporation, Rochester Hills, MI (US)

(72) Inventor: Christopher A. Weber, Troy, MI (US)

(73) Assignee: Trico Products Corporation, Rochester Hills, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/910,350

(22) Filed: Jun. 5, 2013

(65) Prior Publication Data
US 2013/0269143 A1    Oct. 17, 2013

Related U.S. Application Data

(63) Continuation of application No. 12/869,102, filed on Aug. 26, 2010, now Pat. No. 8,533,899.

(60) Provisional application No. 61/237,395, filed on Aug. 27, 2009.

(51) Int. Cl.
*B60S 1/40*    (2006.01)
*B60S 1/38*    (2006.01)

(52) U.S. Cl.
CPC ............. *B60S 1/38* (2013.01); *B60S 1/3863* (2013.01); *B60S 1/3851* (2013.01); *B60S 1/3856* (2013.01); *B60S 1/381* (2013.01)
USPC ............. 15/250.361; 15/250.32; 15/250.43; 15/250.48; 15/250.201

(58) Field of Classification Search
USPC ............. 15/250.32, 250.201, 250.41, 250.43, 15/250.48, 250.451, 250.452, 250.453, 15/250.454, 250.44, 250.361

IPC .................................................. B60S 1/40,1/38
See application file for complete search history.

(56) References Cited

U.S. PATENT DOCUMENTS

| 2,589,339 A | 3/1952 | Carson |
| 2,616,112 A | 11/1952 | Smulski |

(Continued)

FOREIGN PATENT DOCUMENTS

| DE | 1028896 B | 4/1958 |
| DE | 1247161 B | 8/1967 |

(Continued)

OTHER PUBLICATIONS

Apr. 29, 2011 PCT International Search Report and Written Opinion for PCT/US2010/046761.

*Primary Examiner* — Joseph J Hail
*Assistant Examiner* — Marc Carlson
(74) *Attorney, Agent, or Firm* — Howard & Howard Attorneys PLLC

(57) ABSTRACT

A windshield wiper assembly including a wiping element adapted to contact a surface to be wiped. The wiping element includes at least one isolation pad formed thereon and wherein the isolation pad defines a portion of increased lateral width of the wiping element. A coupler assembly includes an adapter with at least one claw that corresponds to the isolation pad. The claw has a downwardly extending leg and an inwardly extending retainer portion that cooperates with the isolation pad to interconnect the adapter to the wiping element. The interaction of the isolation pad and the claw acts to securely mount the adapter to the wiping element in a cost-effective manner while reducing noise, vibration, and harshness (NVH) associated with the operation of the wiper system.

12 Claims, 4 Drawing Sheets

(56) References Cited

U.S. PATENT DOCUMENTS

| | | | |
|---|---|---|---|
| 2,643,411 | A | 6/1953 | Nesson |
| 2,746,077 | A * | 5/1956 | Higgins ............... 15/250.07 |
| 2,760,220 | A * | 8/1956 | Deibel ............... 15/250.452 |
| 2,766,474 | A * | 10/1956 | Horton ............... 15/250.452 |
| 2,799,887 | A | 7/1957 | Nemic |
| 2,801,436 | A | 8/1957 | Scinta |
| 2,814,820 | A | 12/1957 | Elliott et al. |
| 2,932,843 | A | 4/1960 | Zaiger et al. |
| 2,937,393 | A | 5/1960 | Brueder |
| 2,946,078 | A | 7/1960 | Deibel et al. |
| 2,974,341 | A | 3/1961 | Hart |
| 3,029,460 | A | 4/1962 | Hoyler |
| 3,037,233 | A | 6/1962 | Peras et al. |
| 3,056,991 | A | 10/1962 | Smithers |
| 3,060,480 | A * | 10/1962 | Ziegler ............... 15/250.452 |
| 3,082,464 | A | 3/1963 | Smithers |
| 3,088,155 | A | 5/1963 | Smithers |
| 3,089,174 | A | 5/1963 | Bignon |
| 3,089,175 | A * | 5/1963 | Hinder ............... 15/250.43 |
| 3,092,867 | A * | 6/1963 | Ziegler ............... 15/250.452 |
| 3,094,734 | A * | 6/1963 | Hoyler ............... 15/250.451 |
| 3,104,412 | A | 9/1963 | Hinder |
| 3,116,509 | A | 1/1964 | Contant et al. |
| 3,132,367 | A | 5/1964 | Wise |
| 3,140,501 | A * | 7/1964 | MacPherson ............... 15/250.44 |
| 3,147,507 | A | 9/1964 | Glynn |
| 3,179,969 | A | 4/1965 | Glynn |
| 3,192,551 | A | 7/1965 | Appel |
| 3,233,273 | A * | 2/1966 | Anderson ............... 15/250.452 |
| 3,234,578 | A | 2/1966 | Golub et al. |
| 3,296,647 | A | 1/1967 | Gumbleton |
| 3,317,945 | A | 5/1967 | Ludwig |
| 3,317,946 | A | 5/1967 | Anderson |
| 3,350,738 | A | 11/1967 | Anderson |
| 3,378,874 | A | 4/1968 | Scinta |
| D211,570 | S | 7/1968 | Tomlin |
| 3,418,679 | A | 12/1968 | Barth et al. |
| 3,480,986 | A | 12/1969 | Forster |
| 3,588,942 | A | 6/1971 | Schlesinger |
| 3,618,155 | A | 11/1971 | Mower |
| 3,641,614 | A | 2/1972 | Newsome |
| 3,665,544 | A | 5/1972 | Sakamoto |
| 3,667,083 | A * | 6/1972 | Linker ............... 15/250.06 |
| 3,673,631 | A | 7/1972 | Yamadai et al. |
| 3,685,086 | A | 8/1972 | Froehlich |
| 3,751,754 | A | 8/1973 | Quinlan et al. |
| 3,780,395 | A | 12/1973 | Quinlan et al. |
| 3,798,703 | A * | 3/1974 | Den Berg et al. ............... 15/250.454 |
| 3,845,519 | A | 11/1974 | Quinlan et al. |
| 3,862,465 | A | 1/1975 | Ito |
| 3,872,537 | A | 3/1975 | Biachi |
| 3,879,793 | A | 4/1975 | Schlegel |
| 3,881,214 | A | 5/1975 | Palu |
| 4,028,770 | A | 6/1977 | Appel |
| 4,063,328 | A | 12/1977 | Arman |
| 4,083,642 | A | 4/1978 | Journee |
| 4,102,003 | A | 7/1978 | Hancu |
| 4,127,916 | A | 12/1978 | van den Berg et al. |
| 4,132,490 | A | 1/1979 | Journee |
| 4,158,513 | A | 6/1979 | Journee |
| 4,224,001 | A | 9/1980 | Arndt et al. |
| 4,300,259 | A | 11/1981 | Maiocco |
| 4,309,790 | A | 1/1982 | Bauer et al. |
| 4,339,839 | A | 7/1982 | Knights |
| 4,343,063 | A | 8/1982 | Batt |
| D267,939 | S | 2/1983 | Duvoux |
| D268,020 | S | 2/1983 | Duvoux |
| 4,400,845 | A | 8/1983 | Noguchi et al. |
| 4,416,032 | A | 11/1983 | Mohnach et al. |
| 4,422,207 | A | 12/1983 | Maiocco et al. |
| 4,438,543 | A | 3/1984 | Noguchi et al. |
| 4,464,808 | A | 8/1984 | Berry |
| 4,547,925 | A | 10/1985 | Blackborow et al. |
| 4,561,143 | A | 12/1985 | Beneteau |
| 4,570,284 | A | 2/1986 | Verton |
| 4,587,686 | A | 5/1986 | Thompson |
| 4,590,638 | A | 5/1986 | Beneteau |
| 4,741,071 | A | 5/1988 | Bauer et al. |
| 4,766,636 | A | 8/1988 | Shinpo |
| 4,782,547 | A | 11/1988 | Mohnach |
| 4,807,326 | A | 2/1989 | Arai et al. |
| 4,852,206 | A | 8/1989 | Fisher |
| D307,408 | S | 4/1990 | Mower et al. |
| D308,660 | S | 6/1990 | Fisher |
| D308,845 | S | 6/1990 | Charet et al. |
| 4,976,001 | A | 12/1990 | Wright |
| 4,980,944 | A | 1/1991 | Longman |
| 4,984,325 | A | 1/1991 | Arai et al. |
| 4,989,290 | A | 2/1991 | Hoshino |
| 5,042,106 | A | 8/1991 | Maubray |
| 5,056,183 | A | 10/1991 | Haney, III |
| 5,062,176 | A | 11/1991 | Unterborn et al. |
| 5,084,933 | A | 2/1992 | Buechele |
| 5,086,534 | A | 2/1992 | Journee |
| 5,093,954 | A | 3/1992 | Kuzuno |
| 5,123,140 | A | 6/1992 | Raymond |
| 5,138,739 | A | 8/1992 | Maubray |
| 5,168,596 | A | 12/1992 | Maubray |
| 5,168,597 | A | 12/1992 | Schoen et al. |
| 5,170,527 | A | 12/1992 | Lyon, II |
| 5,179,761 | A | 1/1993 | Buechele et al. |
| 5,206,969 | A | 5/1993 | Patterson et al. |
| 5,218,735 | A | 6/1993 | Maubray |
| 5,228,167 | A | 7/1993 | Yang |
| 5,233,721 | A | 8/1993 | Yang |
| 5,257,436 | A | 11/1993 | Yang |
| 5,276,937 | A | 1/1994 | Lan |
| 5,283,925 | A | 2/1994 | Maubray |
| 5,307,536 | A | 5/1994 | Lescher |
| 5,311,636 | A | 5/1994 | Lee |
| 5,319,826 | A | 6/1994 | Mower |
| 5,325,564 | A | 7/1994 | Swanepoel |
| 5,332,328 | A | 7/1994 | Yang |
| 5,383,249 | A | 1/1995 | Yang |
| 5,392,487 | A | 2/1995 | Yang |
| 5,392,489 | A | 2/1995 | Mohnach |
| 5,412,834 | A * | 5/1995 | Burkard et al. ............ 15/250.452 |
| 5,454,135 | A | 10/1995 | Okuya et al. |
| 5,463,790 | A | 11/1995 | Chiou et al. |
| 5,485,650 | A * | 1/1996 | Swanepoel ............... 15/250.43 |
| 5,509,166 | A | 4/1996 | Wagner et al. |
| 5,553,962 | A | 9/1996 | Eustache |
| 5,606,765 | A | 3/1997 | Ding |
| 5,611,103 | A | 3/1997 | Lee |
| 5,618,124 | A | 4/1997 | Chen |
| 5,632,059 | A | 5/1997 | Lee |
| 5,724,700 | A | 3/1998 | Marks |
| 5,807,016 | A | 9/1998 | Herring et al. |
| 5,885,023 | A | 3/1999 | Witek et al. |
| 5,937,474 | A | 8/1999 | Hussaini |
| 5,946,764 | A | 9/1999 | Tworzydlo |
| 5,956,801 | A * | 9/1999 | Jeffer et al. ............... 15/250.452 |
| 6,000,093 | A | 12/1999 | Charng |
| 6,004,659 | A * | 12/1999 | Leutsch et al. ............... 428/212 |
| 6,158,078 | A | 12/2000 | Kotlarski |
| 6,161,249 | A | 12/2000 | Hussaini |
| 6,163,922 | A * | 12/2000 | Fisher et al. ............... 15/250.48 |
| 6,185,805 | B1 | 2/2001 | Rosiere et al. |
| 6,195,833 | B1 * | 3/2001 | Geilenkirchen et al. ... 15/250.48 |
| 6,279,191 | B1 | 8/2001 | Kotlarski et al. |
| 6,292,974 | B1 | 9/2001 | Merkel et al. |
| 6,332,236 | B1 | 12/2001 | Ku |
| 6,353,962 | B1 | 3/2002 | Matsumoto et al. |
| 6,434,780 | B1 | 8/2002 | Kotlarski |
| 6,523,218 | B1 | 2/2003 | Kotlarski |
| 6,550,096 | B1 | 4/2003 | Stewart et al. |
| 6,553,607 | B1 | 4/2003 | De Block |
| 6,581,237 | B1 | 6/2003 | Kotlarski |
| 6,591,445 | B2 | 7/2003 | Nacamuli |
| 6,599,051 | B1 | 7/2003 | Jarasson |
| 6,611,988 | B1 | 9/2003 | De Block |
| 6,625,842 | B1 | 9/2003 | De Block |
| 6,634,056 | B1 | 10/2003 | De Block |
| 6,654,983 | B1 | 12/2003 | Raynaud |

(56) References Cited

U.S. PATENT DOCUMENTS

| | | |
|---|---|---|
| 6,665,905 B2 | 12/2003 | Wegner et al. |
| 6,668,419 B1 | 12/2003 | Kotlarski |
| 6,671,922 B1 * | 1/2004 | Geilenkirchen et al. ... 15/250.48 |
| 6,675,433 B1 | 1/2004 | Stewart et al. |
| 6,675,434 B1 | 1/2004 | Wilhelm et al. |
| 6,687,948 B2 | 2/2004 | Kotlarski |
| 6,779,223 B1 | 8/2004 | Roekens |
| 6,789,289 B2 | 9/2004 | Roodt |
| 6,792,644 B2 | 9/2004 | Roodt |
| 6,810,556 B1 * | 11/2004 | Kotlarski ............... 15/250.43 |
| 6,836,924 B2 | 1/2005 | Egan-Walter |
| 6,836,926 B1 | 1/2005 | De Block |
| 6,910,244 B2 * | 6/2005 | De Block et al. ......... 15/250.32 |
| 6,944,905 B2 | 9/2005 | De Block et al. |
| 6,966,096 B2 | 11/2005 | Bascotto et al. |
| 7,028,368 B2 | 4/2006 | Lee et al. |
| 7,055,207 B2 | 6/2006 | Coughlin |
| 7,150,066 B1 | 12/2006 | Huang |
| 7,207,082 B2 | 4/2007 | Lee |
| 7,228,588 B2 | 6/2007 | Kraemer et al. |
| 7,281,294 B2 | 10/2007 | Wilms et al. |
| 7,350,259 B2 | 4/2008 | Walworth et al. |
| 7,451,520 B2 | 11/2008 | Weiler et al. |
| 7,523,522 B2 | 4/2009 | Herring et al. |
| 7,543,353 B2 * | 6/2009 | Ko ........................ 15/250.201 |
| 7,546,660 B2 | 6/2009 | Heinrich et al. |
| 7,559,110 B1 | 7/2009 | Kotlarski et al. |
| 7,581,279 B2 | 9/2009 | Baseotto et al. |
| 7,621,016 B2 | 11/2009 | Verelst et al. |
| 7,992,248 B2 * | 8/2011 | Koppen et al. ............ 15/250.32 |
| 8,020,246 B2 * | 9/2011 | Bauer et al. ............. 15/250.32 |
| 2001/0004783 A1 * | 6/2001 | Kotlarski ................. 15/250.32 |
| 2003/0009842 A1 * | 1/2003 | Egner-Walter ............ 15/250.43 |
| 2004/0111820 A1 | 6/2004 | Aoyama et al. |
| 2004/0181894 A1 * | 9/2004 | Lee et al. ................ 15/250.201 |
| 2004/0250369 A1 * | 12/2004 | Matsumoto et al. ..... 15/250.201 |
| 2006/0130263 A1 | 6/2006 | Coughlin |
| 2006/0207050 A1 | 9/2006 | Shanmugham et al. |
| 2007/0174989 A1 | 8/2007 | Moll et al. |
| 2007/0180643 A1 * | 8/2007 | Kim ........................ 15/250.201 |
| 2008/0196192 A1 * | 8/2008 | Yao ........................ 15/250.46 |
| 2008/0295272 A1 * | 12/2008 | Jarasson .................. 15/250.32 |
| 2009/0089956 A1 * | 4/2009 | De Block et al. ........ 15/250.201 |
| 2009/0199357 A1 | 8/2009 | Thienard |
| 2010/0236008 A1 * | 9/2010 | Yang et al. ................ 15/250.32 |
| 2010/0281645 A1 * | 11/2010 | Kim et al. ................. 15/250.32 |
| 2011/0047742 A1 | 3/2011 | Kim et al. |
| 2011/0162162 A1 * | 7/2011 | Fujiwara et al. ......... 15/250.361 |

FOREIGN PATENT DOCUMENTS

| | | | |
|---|---|---|---|
| DE | 1505397 A1 | 10/1969 | |
| DE | 1655410 A1 | 8/1971 | |
| DE | 2311293 A1 | 9/1974 | |
| DE | 2336271 A1 | 2/1975 | |
| DE | 2350302 A1 | 4/1975 | |
| DE | 2353368 A1 | 5/1975 | |
| DE | 2640399 A1 | 3/1977 | |
| DE | 3339414 A1 * | 5/1985 | ............... B60S 1/38 |
| DE | 19729865 A1 | 1/1999 | |
| DE | 19734843 A1 | 2/1999 | |
| DE | 19814609 A1 | 10/1999 | |
| DE | 10335393 A1 | 9/2004 | |
| EP | 0 007 017 A1 | 6/1979 | |
| EP | 0422921 A1 | 4/1991 | |
| EP | 0465095 A1 | 1/1992 | |
| EP | 0594451 A1 | 4/1994 | |
| FR | 1069875 A | 2/1954 | |
| FR | 2377302 A1 | 8/1978 | |
| FR | 2515121 A1 | 4/1983 | |
| GB | 878951 A | 10/1961 | |
| GB | 1012902 A | 12/1965 | |
| GB | 1489791 | 4/1975 | |
| GB | 1395918 A | 5/1975 | |
| GB | 2308542 A | 7/1997 | |
| JP | 2007-331748 A | 12/2007 | |
| WO | 0021809 A1 | 4/2000 | |
| WO | 02087935 A1 | 11/2002 | |
| WO | 03051696 A1 | 6/2003 | |
| WO | 03080409 A1 | 10/2003 | |
| WO | 2004048163 A1 | 6/2004 | |
| WO | 2004076251 A1 | 9/2004 | |
| WO | 2004076252 A1 | 9/2004 | |
| WO | 2006069648 A1 | 7/2006 | |
| WO | 2009133979 A1 | 11/2009 | |
| WO | 2011131395 A2 | 10/2011 | |

* cited by examiner

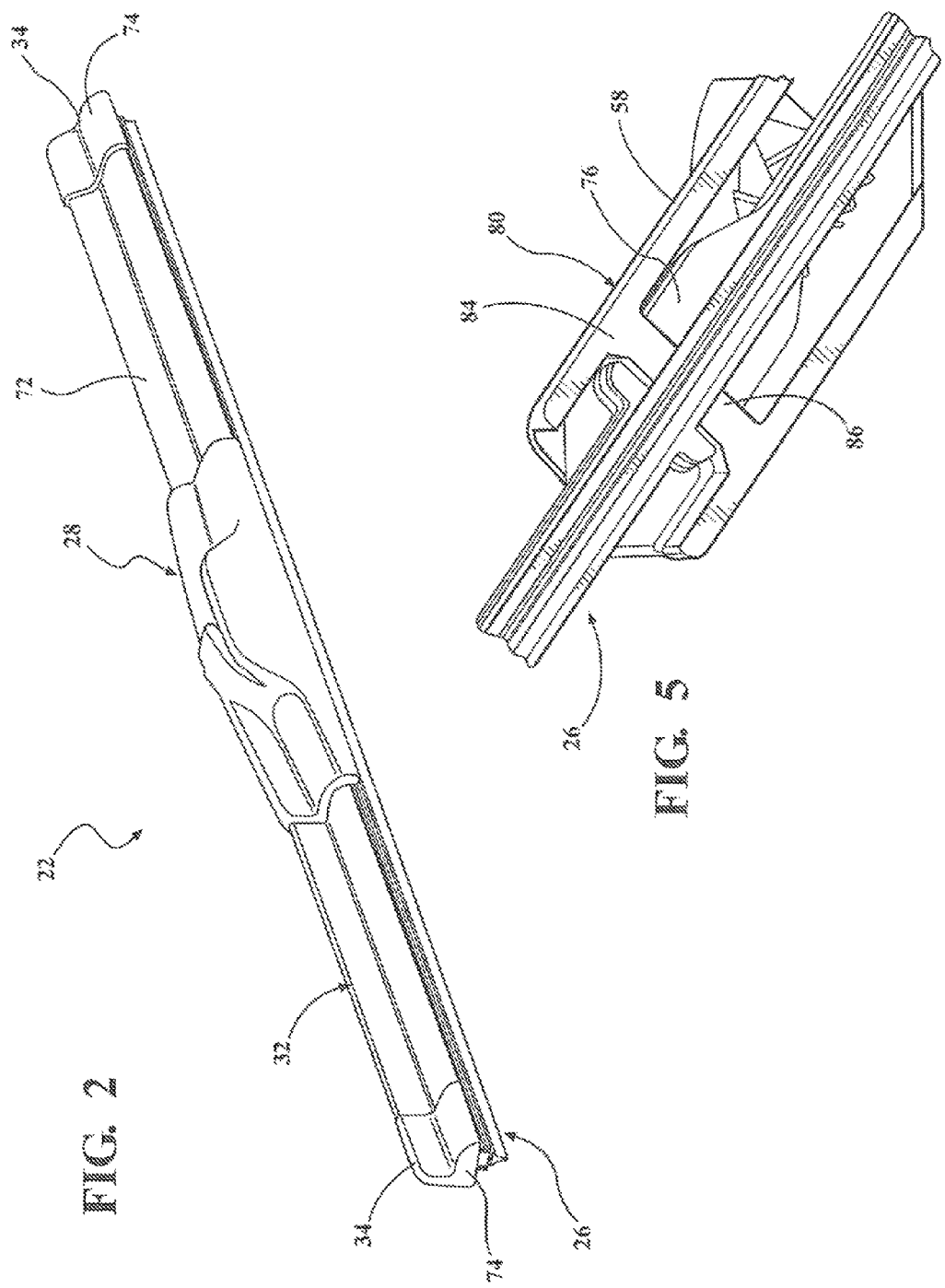

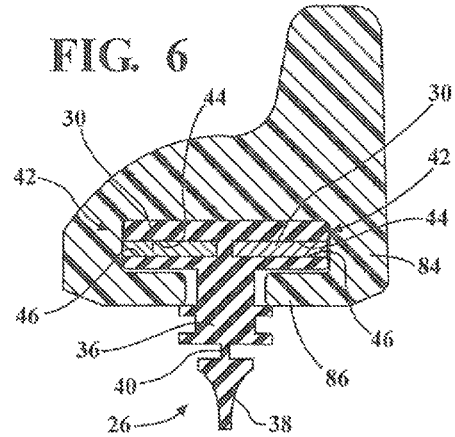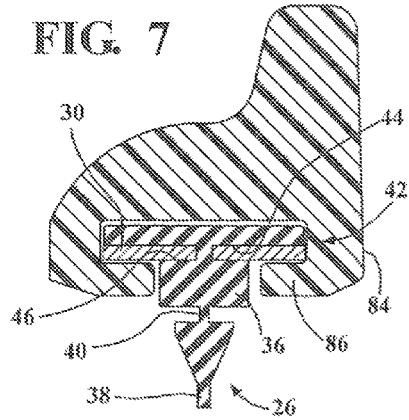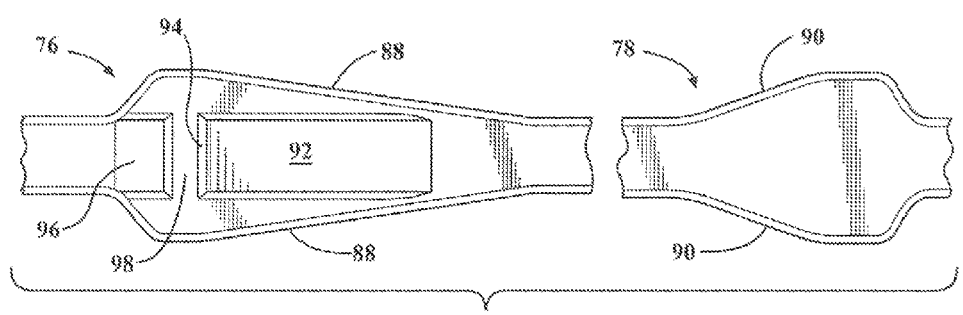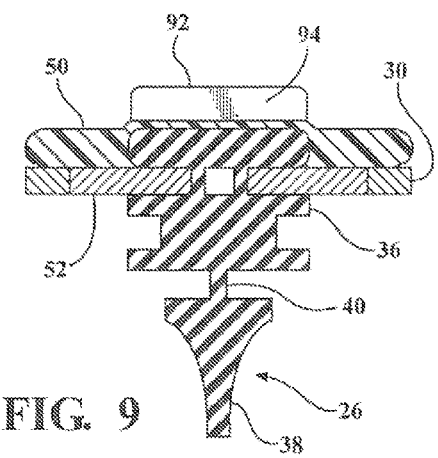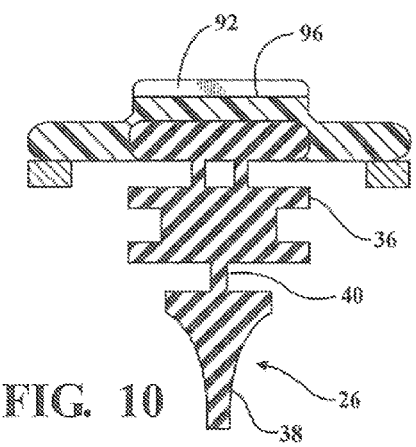

US 8,819,889 B2

WINDSHIELD WIPER ASSEMBLY

CROSS-REFERENCE TO RELATED APPLICATION(S)

This application is a continuation of U.S. Ser. No. 12/869, 102 filed on Aug. 26, 2010 and which claims the benefit of U.S. provisional patent application entitled "Windshield Wiper Assembly," having Ser. No. 61/237,395, and filed on Aug. 27, 2009.

BACKGROUND OF THE INVENTION

1. Field of the Invention

The present invention relates, generally, to windshield wiper assemblies, and more specifically, to a windshield wiper assembly having a lower cost of manufacture along with improved noise, vibration, and harshness (NVH) characteristics.

2. Description of the Related Art

Conventional windshield wiper assemblies known in the related art include some type of blade assembly mounted to an arm which, in turn, is mounted adjacent the windshield and pivotally driven to impart reciprocal motion to the wiper blade assembly across the windshield. A rubber wiping element is supported by the blade assembly and contacts the windshield across the surface to be wiped. The wiper element often incorporates one or more metal strips which act to reinforce the wiper element and facilitate wiping contact by the element across what is typically a curved glass surface. In this context, the wiper arm delivers a downward force to the blade assembly that is distributed thereacross pressing the blade assembly into contact with the windshield.

While windshield wiper assemblies known in the related art have generally worked for their intended purposes, there is an ongoing effort to lower the cost of manufacture and improve the operation of these assemblies in ways which have heretofore not been obvious to persons having ordinary skill in the art.

SUMMARY OF THE INVENTION

The present invention overcomes the disadvantages in the related art in a windshield wiper assembly including a wiping element adapted to contact a surface to be wiped. The wiping element includes at least one isolation pad formed thereon and wherein the isolation pad defines a portion of increased lateral width of the wiping element. The windshield wiper assembly also includes a coupler assembly that has an adapter with at least one claw that corresponds to the isolation pad. The claw has a downwardly extending leg and an inwardly extending retainer portion that cooperates with the isolation pad to interconnect the adapter to the wiping element. The interaction of the isolation pad and the claw acts to securely mount the adapter to the wiping element in a cost-effective manner while reducing noise, vibration, and harshness (NVH) associated with the operation of the wiper system.

BRIEF DESCRIPTION OF THE DRAWINGS

Other objects, features and advantages of the present invention will be readily appreciated as the same becomes better understood after reading the subsequent description taken in connection with the accompanying drawings wherein:

FIG. 2 is a perspective view of a windshield wiper assembly according to one embodiment of the present invention;

FIG. 5 is a partial perspective bottom view illustrating the attachment of the coupler assembly to the wiper blade of the present invention;

FIG. 6 is a cross-sectional end view of one embodiment of the windshield wiper assembly of the present invention taken through the coupler;

FIG. 7 is a cross-sectional end view of another embodiment of the windshield wiper assembly of the present invention take through the coupler;

FIG. 8 is a partial broken-away top view of the wiping element illustrating a pair of isolation pads of the present invention;

FIG. 9 is cross-sectional end view taken through the wiping element and the pair of rails illustrating the features of the stop mechanism of the present invention; and FIG. 10 is a cross-sectional end view taken through the wiping element illustrating features of the stop element of the present invention.

DETAILED DESCRIPTION OF THE PREFERRED EMBODIMENT(S)

Figure 1:
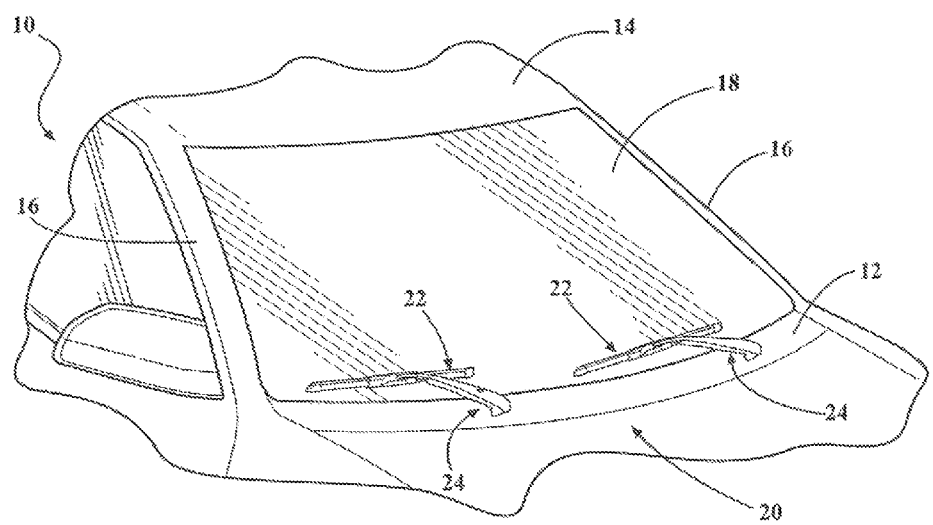
FIG. 1 is a partial perspective view of the front of an automotive vehicle having a pair of windshield wiper assemblies, according to one embodiment of the present invention, pivotally mounted for reciprocal movement across the windshield of the vehicle.

Referring now to the figures, where like numerals are used to designate like structure, a portion of a vehicle is illustrated at 10 in FIG. 1. The vehicle body includes a cowl 12, a roof 14, and a pair of laterally spaced front or "A" pillars 16 extending between the roof 14 and the cowl 12. The A-pillars 16, roof 14, and cowl 12 cooperate to define a generally rectangular perimeter, which supports a curved or "swept back" windshield 18.

A windshield wiper system is generally indicated at 20 in FIG. 1 and is employed to clean the glass windshield 18. The windshield wiper system 20 includes a pair of wiper assemblies, generally indicated at 22, and which correspond to the driver and passenger side of the vehicle 10. Each windshield wiper assembly 22 (hereinafter "wiper assembly") is carried by a corresponding wiper arm assembly, generally indicated at 24. The wiper arm assembly 24 includes an attachment member (not shown but generally known in the art) adapted to operatively engage a wiper assembly 22. An electrical motor (not shown but generally known in the art) is typically employed to power the wiper system 20 to move the windshield wiper assemblies 22 in an oscillating manner across the surface of the windshield 18.

While the wiper assembly 22 illustrated in FIG. 1 is shown in connection with the front windshield 18 of the vehicle 10, those having ordinary skill in the art will appreciate that wiper assemblies 22 may be employed in other areas of a vehicle 10, such as a rear window (not shown) or a head lamp (not shown) that employs a wiper system 20. Thus, it will be understood that the present invention is not limited for use solely in connection with wiper arm assemblies 24 and windshield wiper assemblies 22 adapted for use on a vehicle's windshield 18, but for use in all applications where wiper arm assemblies 24 and wiper assemblies 22 are employed.

Figure 3:
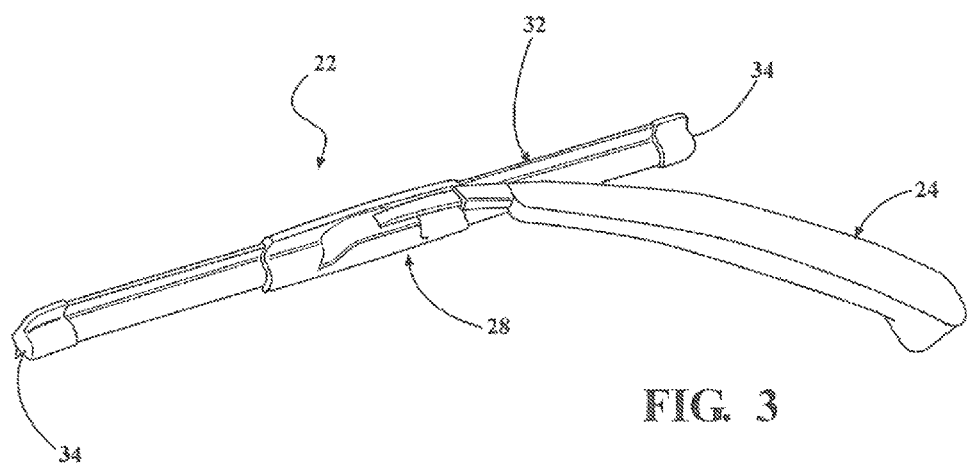
FIG. 3 is a perspective view of the windshield wiper assembly mounted to the wiper arm assembly.
Figure 4:
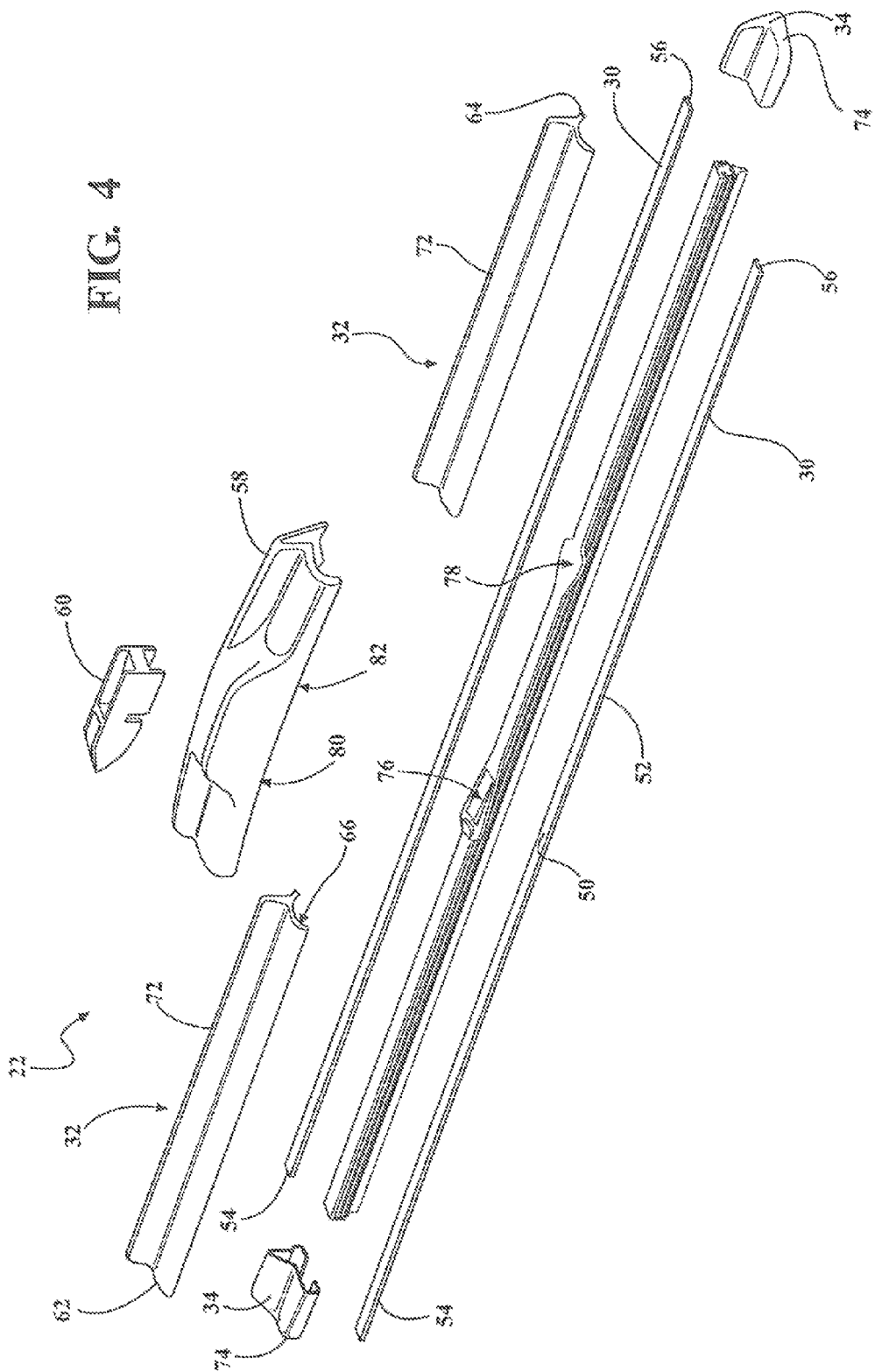
FIG. 4 is an exploded view of the windshield wiper assembly according to one embodiment of the present invention.

Referring to FIGS. 2-4, the wiper assembly 22 includes a wiping element, generally indicated at 26, that is adapted to contact the surface of the vehicle 10 to be wiped, in this representative example, the windshield 18. In addition, the wiper assembly 22 generally includes a coupler assembly, generally indicated at 28, that acts to interconnect the wiper arm assembly 24 and the wiping element 26. A pair of rails or splines, generally indicated at 30, is operatively supported in the wiping element 26. The wiper assembly 22 may also include an airfoil assembly, generally indicated at 32, and a pair of end caps, generally indicated at 34. Each of these components will be described in greater detail below.

As best shown in FIGS. 7 and 9-10, the wiping element 26 includes an upper section 36 and a lower section 38 that are partitioned by a longitudinally extending bridge portion 40. The bridge portion 40 provides flexibility between the upper section 36 and lower section 38 during operational movement of the wiper assembly 22 across the surface to be wiped. The upper section 36 includes a pair of grooves, generally indicated at 42, extending in the direction of the longitudinal axis of the wiping element 26. The grooves 42 are disposed on either side of the wiping element 26 and have laterally extending open ends disposed on opposite sides of the wiping element 26 with respect to each other. The grooves define an upper surface 44 and a lower surface 46. The wiping element 26 includes a predetermined length corresponding to particular application and is often manufactured through an extrusion process, which enables the length of the wiping element 26 to be easily adjusted without a substantial increase to manufacturing expense. Furthermore, while the wiping element 26 of the present invention is constructed from a flexible rubber, those having ordinary skill in the art will appreciate that it may be constructed from any flexible material such as silicone or other polymer without departing from the scope of the invention.

As noted above, the windshield wiper assembly 22 further includes a pair of splines or rails, generally indicated at 30. The rails 30 includes an upper surface 50 and a lower surface 52 that extend between first and second longitudinal ends 54 and 56, respectively (FIG. 4). Each rail 30 is adapted to be received in a snug fashion in a corresponding one of the grooves 42 formed on the upper section 36 of the wiping element 26. Thus, the upper surface 50 of each rail 30 is disposed in abutting contact with the upper surface 44 of the corresponding groove 42. Similarly, the lower surface 52 of the rail 30 is disposed in abutting contact with the lower surface 46 of the corresponding groove 42. The rails 30 may be constructed from a resiliently flexible material, such as spring steel or a polymer, and are adapted to apply force from an intermediate position between the first and second longitudinal ends 54 and 56 to the first and second longitudinal ends 54 and 56. More specifically, the rails 30 receive force from the spring-loaded wiper arm assembly 24 at an intermediate position and distribute this force across the span of the rails toward the first and second longitudinal ends 54 and 56. To that end, the rails 30 may be curved longitudinally with a predetermined radius of curvature parallel to the plane of curvature of the windshield 18. This predetermined radius of curvature is sometimes referred to in the related art as a "free form" radius of curvature. Accordingly, the curvature of the rails 30 may be symmetrical or asymmetrical depending on the force requirements and the contour of the windshield 18. The flexible, free form, pre-curved rails 30 straighten out when the wiper arm assembly 24 applies a force thereto to flatten the rails 30 and directs the wiping element 26 to contact the windshield 18. Thus, the elongated rails 30 include a free-form curvature that ensures force distribution on windshields having various curvatures that effects proper wrapping about the windshield 18.

As illustrated throughout the figures, the rails 30 have a substantially constant width and may have a constant thickness throughout the length between the first and second longitudinal ends 54 and 56. The constant width and thickness are adapted to provide high lateral and torsional stiffness to avoid lateral and torsional deflection, which causes the wiping element 26 to stick/slip ("chatter") on the windshield 18 during operation. Thus, the cross-section of the rails 30 has a generally rectangular outer profile which makes the elongated rails 30 easier to manufacture. More specifically, where the rails 30 are constructed from metal, such as spring steel, the tools and machinery used to manufacture the rails 30 are less complicated than that required to manufacture rails having varying widths and/or thicknesses. Furthermore, where the rails 30 are constructed from a polymer, such as a thermoplastic elastomer, the tools and extrusion process machinery are also less complicated than those employed to manufacture rails having varying widths and/or thicknesses. However, those having ordinary skill in the art will appreciate that the rails 30 illustrated herein may include a varying thickness and/or width without departing from the scope of the invention. By way of example, the width and/or thickness of the rails 30 may taper linearly from the beam center, sinusoidally, parabolically, or asymmetrically. Additionally, each rail is illustrated throughout the figures as a single, integral piece of material such that it defines a consolidated cross-section. However, those having ordinary skill in the art will appreciate that the rails 30 may be formed into a single piece by a plurality of laminates.

As noted above and as best shown in FIG. 4, the wiper assembly 22 also includes a coupler assembly, generally indicated at 28. The coupler assembly is adapted to connect the wiper assembly 22 to the wiper arm assembly 24. More specifically, the coupler assembly 28 includes an adapter, generally indicated at 58, and a connector, generally indicated at 60. The connector 60 is employed to operatively interconnect the wiper arm assembly 24 to the wiper assembly 22 via the adapter. Those having ordinary skill in the art will appreciate that the connector 60 includes structure that corresponds to at least one particular type of wiper arm assembly attachment member, but may include structure that corresponds to multiple types of wiper arm assembly attachment members. By way of example, different OEM's employ wiper arm assemblies having different attachment members adapted to operatively engage a specific beam blade wiper assembly. Accordingly, the coupler assembly 28 illustrated herein includes a connector 60 having structure that operatively engages at least one or more of these different attachment members. Further by way of example, certain wiper arm assemblies employed by OEM's include "bayonet-style"; "pin-type"; or "hook-type" attachment members that operatively engage the wiper assemblies. Accordingly, the connector 60 illustrated herein may include structure for operatively engaging at least one or more of these different attachment members for use in connection with wiper assemblies without departing from the scope of the invention.

In one embodiment, the connector 60 is pivotally attached to the adapter 58. Those having ordinary skill in the art will appreciate that, while the connector 60 is pivotally attached to the adapter 58, the connector 60 may be attached in a pivotally fixed manner or may be removable from the adapter 58 to provide a wiper assembly having interchangeable connectors 60 that accommodate different attachment members, as described above. Contrary to conventional wiper assemblies, which may include a small contact point through which force from the wiper arm assembly is distributed, the adapter 58 of the present invention broadens the initial point at which force is applied from the wiper arm assembly 24 to the rails 30. In this manner, the downward force from the wiper arm assembly 24 is distributed with more efficiency to the longitudinal ends 54 and 56 of the rails 30, thereby reducing chatter and improving wiping action.

The airfoil, generally indicated at 32, acts to reduce the likelihood of wind lift. The airfoil 32 includes first and second distal ends 62, 64. The airfoil 32 further includes an attachment portion, generally indicated at 66 that is attached to the wiper assembly 22. The airfoil 32 may be manufactured through an extrusion process. In one embodiment, the attachment portion 66 may include a pair of legs depending from the body of the adaptor. The legs are adapted to operatively engage a portion of the rubber wiping element 26.

The airfoil 32 includes a spoiler 72 that is adapted to reduce the likelihood of wind lift by utilizing airflow to generate downward force on to the wiper assembly 22. To this end, the spoiler 72 tapers inwardly from the base toward the terminal point to define a profile that is slightly contoured (FIG. 4).

As noted above, the wiper assembly 22 of the present invention further includes a pair of end caps, generally indicated at 34. The end caps 34 are adapted to operatively engage the distal ends 62, 64 of the airfoil 32. The end caps 34 include a profile that substantially mimics the contours of the airfoil 32 to maintain the wind lift characteristics of the wiper assembly 22 and to provide an increased aesthetic value. The end caps 34 include a closed end 74 that covers the distal ends 62, 64, thereby preventing infiltration of water, ice, and debris which may prevent proper operation of the wiper assembly 22. The closed end 74 of the end caps 34 extend beyond the distal ends 62, 64 of the airfoil 32 to facilitate contact between the outer extremities of the wiping element 26 and the surface to be wiped. More specifically, the end caps 34 provide a mass increase adjacent the distal ends 62, 64 of the airfoil 32 that prevent localized chatter along the extremities of the wiping element 26 caused by the combination of wind lift and a decrease in the force distributed to this area from wiper arm assembly 24 via the rails 30, as described above.

Having described the foregoing general features of the windshield wiper assembly, attention will now be given to certain features of the present invention that facilitate a reduction in the cost of manufacturing the windshield wiper assembly as well as reducing the noise, vibration, and harshness (NVH) associated with the operation of the wiper assembly. To this end, the wiper assembly 22 includes at least one, but preferably two or more isolation pads, generally indicated at 76 and 78 and formed on the upper section 36 of the wiping element 26. Each pad 76, 78 corresponds to one of a pair of claws 80, 82 formed on each side of the adapter 58. Each claw 80, 82 includes a downwardly extending leg 84 and an inwardly extending retainer portion 86. The isolation pads 76, 78 are portions of increased width or lateral thickness formed on the upper section 36 of the wiping element 26 as will be described in greater detail below. The inwardly extending retainer portions 86 of the claws 80, 82 are operatively adapted to cooperate with the isolation pads 76, 78 to interconnect the adapter 58 to the wiping element 26. More specifically, the downwardly extending legs 84 wrap around the outer lateral edges of each rail and the inwardly extending retainer portion 86 is in abutting contact with the bottom of the isolation pads to securely fix the adapter 58 relative to the wiping element 26.

In one operative embodiment illustrated in FIGS. 5-6, the opposed pair of grooves 42 defined in the upper section 36 of the wiping element 26 bisect each pad 76, 78 such that the upper surface 44 of the groove 42 corresponds to an upper portion of the isolation pads 76, 78 and the lower surface 46 of the groove 42 corresponds to a lower portion of the isolation pads 76, 78. Each rail 30 extends through the isolation pads 76, 78 between the upper and lower surfaces 44, 46 and the retainer portion 86 of the claws 80, 82 act to sandwich the rails 30 therebetween.

Alternatively, and in the operative embodiment illustrated in FIG. 7, the isolation pads 76, 78 are defined by sections of increased width that correspond to the upper surface 44 of the opposed grooves 42 defined in the upper section 36 of the wiping element 26. In this embodiment, the inwardly extending retainer portions 86 of the claws 80, 82 are disposed in abutting contact with the rails 30 and act to sandwich the rails 30 between the retainer portions 86 and the upper surfaces 44 portion of the groove 42 that corresponds with the isolation pads 76, 78. In this embodiment, the downwardly extending legs 84 wrap around the outer lateral edges of the rails 30 and the inwardly extending retainer portions 86 are in abutting contact with the bottom of the rails 30 to securely fix the adapter 58 relative to the wiping element 26.

The isolation pads 76, 78 act to reduce noise, vibration, and harshness (NVH) that are otherwise associated with the mounting of the adapter 58 to the wiping element 26. A reduction in the noise, vibration, and harshness (NVH) of the system improves the wipe quality of the wiper system of the present invention over systems known in the related art.

As best shown in FIG. 8, one embodiment of the isolation pads 76, 78 may include side walls tapered in the direction of the longitudinal axis of the wiping element 26. In addition, the tapered side walls of the two isolation pads may have different slopes. For example, the slope of the taper of the side wall 88 of the isolation pad 76 is less than the slope of the taper of the side walls 90 of the isolation pad 78. This difference in the slope of the taper of the side walls 88, 90 of the two isolation pads 76, 78 allows the wiping element 26 to be properly orientated during manufacture.

At least one of the isolation pads 76 may include a positive stop mechanism disposed on the top 100 of the wiping element 26. For example, as best shown in FIG. 8, the isolation pad 76 may include an upwardly extending sloped ramp portion 92 having an end wall 94. An upwardly extending stop portion 96 may be disposed spaced from the end wall 94 with a detent portion 98 disposed therebetween. In this case, the adapter 58 includes a downwardly extending locking member. During installation, the locking member is adapted to ride the sloped surface of the ramp portion 92 and drop into the detent the portion 98 between the stop portion 96 and the end wall 94 of the ramp portion 92 to positively lock the adapter 58 longitudinally relative to the wiping element 26 during manufacture. This feature also acts to retain the wiping element 26 relative to the adapter 58 during operation of the wiper system.

Employing isolation pads 76, 78 having a greater width at predetermined portions along a length of the wiping element 26, as opposed to along its entire length, reduces the cost of material used to manufacture the wiping element 26. In addition, the particular orientation of the isolation pads 76, 78 assists in the manufacture of the wiper system, reduces the scrap rate during manufacture.

The present invention has been described in an illustrative manner. It is to be understood that the terminology which has been used is intended to be in the nature of words of description rather than of limitation. Many modifications and variations of the invention are possible in light of the above teachings. Therefore, within the scope of the appended claims, the invention may be practiced other than as specifically described.

What is claimed is:

1. A windshield wiper assembly comprising:

a rubber wiping element adapted to contact a surface to be wiped, said wiping element defining a longitudinal axis and including at least one isolation pad formed thereon and wherein said isolation pad defines a portion of increased lateral width of said wiping element, and includes sidewalls that taper in the direction of said longitudinal axis of said wiping element; and a coupler assembly that includes an adapter having at least one claw that corresponds to said isolation pad, said claw including a downwardly extending leg and an inwardly extending retainer portion that cooperates with said isolation pad to interconnect said adapter to said wiping element;

said isolation pad defines a top portion facing said adapter and includes a positive stop mechanism disposed on said top portion of said isolation pad; and said positive stop mechanism includes an upwardly extending sloped ramp portion having an end wall extending substantially perpendicular to said longitudinal axis of said wiping element, an upwardly extending stop portion extending substantially perpendicular to said longitudinal axis of said wiping element and disposed in spaced substantially parallel relationship from said end wall and a detent portion defined therebetween, said adapter including a downwardly extending locking member that acts to ride up the ramp portion and drop into the detent portion adjacent said end wall to positively lock the adapter longitudinally relative to said wiping element.

2. The windshield wiper assembly as set forth in claim 1 wherein said wiping element includes a pair of isolation pads disposed spaced from one another along the longitudinal axis of said wiping element, said adapter including a pair of claws corresponding to said pair of isolation pads and cooperating with said isolation pads to interconnect said adapter to said wiping element.

3. The windshield wiper assembly as set forth in claim 1 wherein said wiping element defines a pair of grooves disposed on opposed lateral sides of said wiping element, said grooves having ends that open in a direction away from one another, said wiper assembly further including a pair of elongated rails disposed in said grooves and wherein each of said grooves bisects said isolation pad along said longitudinal axis of said wiping element.

4. The windshield wiper assembly as set forth in claim 3 wherein each groove bisecting said isolation pad defines an upper surface and a lower surface extending through said isolation pad, said rails disposed between said upper and lower surfaces of said isolation pad and said claws disposed in abutting relationship with said isolation pad and acting to sandwich said rails therebetween.

5. The windshield wiper assembly as set forth in claim 3 wherein each groove bisecting said isolation pad defines an upper surface extending through said isolation pad, said rails disposed adjacent said upper surface of said isolation pad and said claws disposed in abutting relationship with said rails and acting to sandwich said rails into contact with said upper surface of said groove bisecting said isolation pad.

6. The windshield wiper assembly as set forth in claim 2 wherein each of said pair of isolation pads include sidewalls that taper in the direction of said longitudinal axis of said wiping element and wherein said tapered sidewalls have different slopes.

7. The windshield wiper assembly as set forth in claim 6 wherein the slope of the sidewall extending in the direction of said longitudinal axis of one isolation pad is less than the slope of the taper of the sidewall of the other isolation pad.

8. A windshield wiper assembly comprising:

a rubber wiping element adapted to contact a surface to be wiped, said wiping element defining a longitudinal axis and a pair of grooves disposed on opposed lateral sides of said wiping element, said grooves having ends that open in a direction away from one another, said wiper assembly further including a pair of elongated rails disposed in said grooves, and a pair of isolation pads disposed spaced from one another along the longitudinal axis of said wiping element, each of said pair of isolation pads including sidewalls that taper in the direction of said longitudinal axis of said wiping element and wherein said tapered sidewalls have different slopes; and a coupler assembly that includes an adapter that is operatively attached to said wiping element, said adapter including a pair of claws corresponding to said pair of isolation pads and cooperating with said isolation pads to interconnect said adapter to said wiping element;

said isolation pad defines a top portion facing said adapter and includes a positive stop mechanism disposed on said top portion of said isolation pad; and said positive stop mechanism includes an upwardly extending sloped ramp portion having an end wall, an upwardly extending stop portion and disposed in spaced substantially parallel relationship from said end wall and a detent portion defined therebetween, said adapter including a downwardly extending locking member that acts to ride up the ramp portion and drop into the detent portion adjacent said end wall to positively lock the adapter longitudinally relative to said wiping element.

9. The windshield wiper assembly as set forth in claim 8 wherein said grooves bisecting said pair of isolation pads define an upper surface and a lower surface extending through said isolation pad, said rails disposed between said upper and lower surfaces of said isolation pad and said pair of claws disposed in abutting relationship with said pair of isolation pads and acting to sandwich said rails therebetween.

10. The windshield wiper assembly as set forth in claim 8 wherein each groove bisecting said pair of isolation pads defines an upper surface extending through said isolation pad, said rails disposed adjacent said upper surface of said pair of isolation pads and said claws disposed in abutting relationship with said rails and acting to sandwich said rails into contact with said upper surface of said pair of grooves bisecting said pair of isolation pads.

11. The windshield wiper assembly as set forth in claim 8 wherein the slope of the sidewall extending in the direction of said longitudinal axis of one isolation pad is less than the slope of the taper of the sidewall of the other isolation pad.

12. A windshield wiper assembly comprising:

a rubber wiping element adapted to contact a surface to be wiped, said wiping element defining a longitudinal axis and including a pair of isolation pads disposed spaced from one another along the longitudinal axis of said wiping element, each of said pair of isolation pads defining a portion of increased lateral width of said wiping element, and includes sidewalls that taper in the direction of said longitudinal axis of said wiping element and wherein said tapered sidewalls have different slopes wherein the slope of the side wall extending in the direction of said longitudinal axis of one isolation pad is less that the slope of the taper of the side wall of the other isolation pad;

a coupler assembly that includes an adapter having a pair of claws corresponding to said pair of isolation pads and cooperating with said isolation pads to interconnect said adapter to said wiping element;

said isolation pads defining a top portion facing said adapter and wherein at least one of said pair of isolation pads includes a positive stop mechanism disposed on said top portion of said isolation pad, said positive stop mechanism including an upwardly extending sloped ramped portion having an end wall, an upwardly extending stop portion disposed spaced from said end wall and a detent portion defined therebetween, said adapter including a downwardly extending locking member that acts to ride up said ramp portion and drop into said detent portion adjacent said end wall to positively lock said adapter longitudinally relative to said wiping element.

\* \* \* \* \*